United States Patent [19]
Shahid

[11] Patent Number: 5,862,281
[45] Date of Patent: Jan. 19, 1999

[54] OPTICAL FIBER CONNECTORS

[75] Inventor: Muhammed Afzal Shahid, Mercer County, N.J.

[73] Assignee: Lucent Technologies Inc., Murray Hill, N.J.

[21] Appl. No.: 923,648

[22] Filed: Sep. 4, 1997

Related U.S. Application Data

[62] Division of Ser. No. 579,231, Dec. 28, 1995, Pat. No. 5,712,939.

[51] Int. Cl.$^6$ .................................................... G02B 6/36
[52] U.S. Cl. ................................................................ 385/78
[58] Field of Search ................................. 385/56, 59, 88, 385/89, 78, 71, 114

[56] References Cited

U.S. PATENT DOCUMENTS

| | | | |
|---|---|---|---|
| 5,712,939 | 1/1998 | Shahid | 385/78 |
| 5,727,097 | 3/1998 | Lee et al. | 385/58 |
| 5,790,733 | 8/1998 | Smith et al. | 385/88 |

*Primary Examiner*—Akm E. Ullah

[57] ABSTRACT

A connector for optical fibers comprises a rigid plug formed from material molded around end portions of the fibers and a pair of hollow tubes. All the fibers and tubes extend along parallel straight lines and all the tubes and fibers terminate in a common external surface of the plug. Alignment pins disposed within and extending outwardly from the tubes are used to align the plug with an optical component also aligned by the guide pins. A method of fabrication uses an alignment block for precisely relatively positioning first portions of the fibers and tubes, but with second portions of the fibers and tubes extending beyond an end of the block. The extending second portions of the fibers and tubes, but not the first portions thereof, are encapsulated within a molded plug which is then severed from the fiber and tube first portions for forming the plug common external surface.

21 Claims, 7 Drawing Sheets

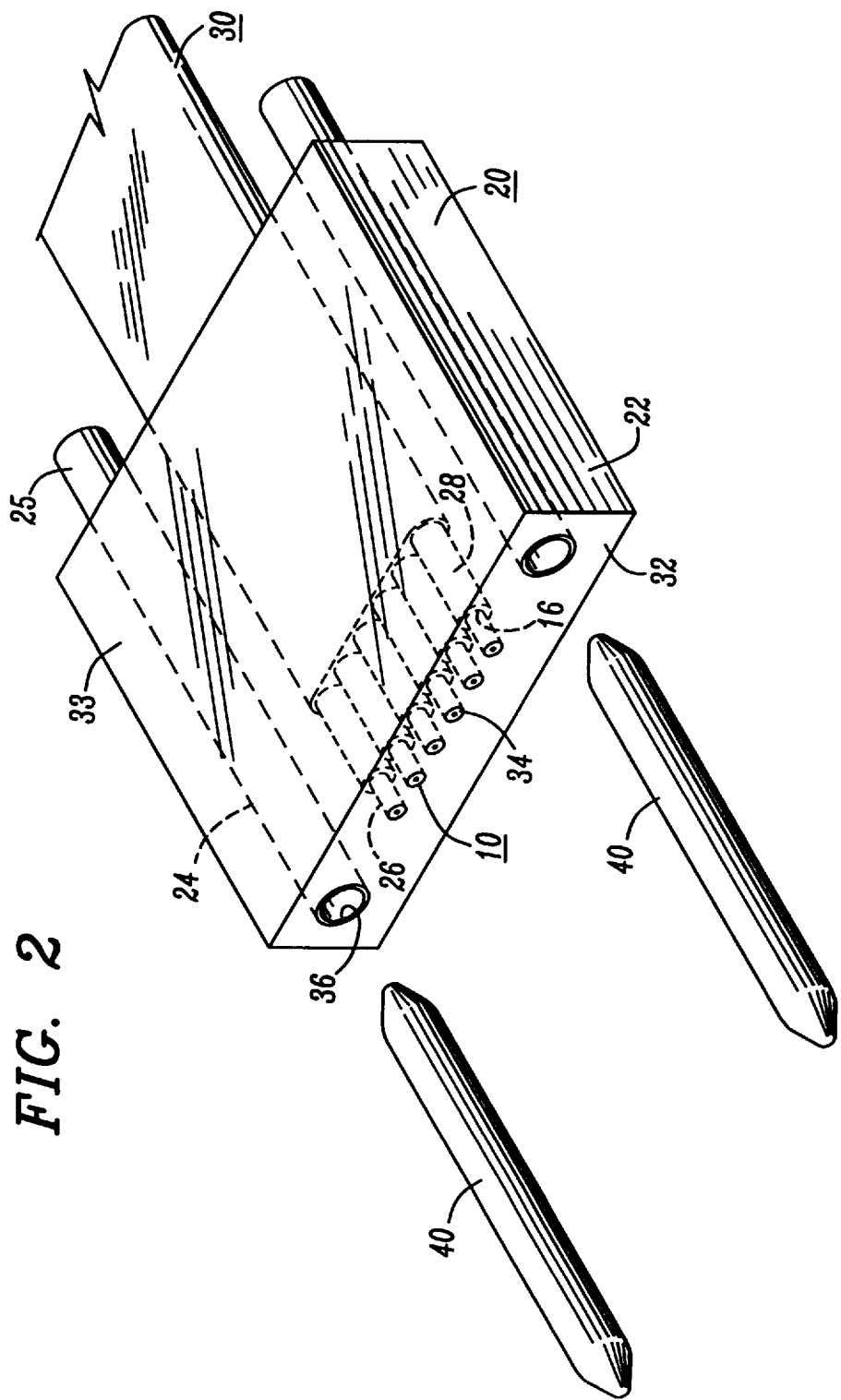

OPTICAL FIBER CONNECTORS

This is a division of application Ser. No. 08/579,231 filed Dec. 28, 1995, now U.S. Pat. No. 5,712,239

BACKGROUND OF THE INVENTION

This invention relates to connectors for interconnecting optical fibers to other optical components and to methods of fabrication of such connectors.

A characteristic of optical fibers is that they are quite small; the operative cores thereof having diameters as small as 8–10 microns for single mode fibers. A requirement for low loss optical couplings between optical fibers and other components, e.g., other optical filers or optical waveguides, is that the central, optical axes of the two components be aligned to an extremely high degree of accuracy, e.g., around 1 micron.

Optical fibers are now in extensive use, and a wide variety of optical connectors are commercially available. Examples of known connectors relevant to the connectors of the present invention are shown in my earlier U.S. Pat. Nos. 5,268,981 (12/17/93), 5,287,426 (2/15/94) and 5,388,174 (2/17/95), the subject matter of which are incorporated herein by reference.

A common feature of many and perhaps all prior art connectors is that the connectors include, as an integral portion thereof, some sort of alignment fixture, typically in the form of one or more blocks each containing a plurality of precisely formed V-grooves. The alignment fixtures serve to precisely position the fibers during fabrication of the connectors and to maintain the fibers in place during use of the connectors. The fixtures, however, being themselves precisely formed, are relatively expensive and the resulting connectors are also relatively expensive.

SUMMARY OF THE INVENTION

An optical fiber connector comprises a rigid plug containing a pair of spaced apart elongated openings and an array of optical fibers. (Although a single opening can be used, as is described hereinafter, two openings are preferable and now described). The openings and fibers are disposed within the plug in precise, spaced apart and preferably parallel relationship with the openings and fibers being exposed at a common external surface of the plug.

In use of the connector, an alignment pin is disposed snugly within each of the plug openings and extends outwardly therefrom. The alignment pins are thus precisely aligned with the optical fibers within the connector and, by inserting the alignment pins into corresponding openings in other optical components, e.g., identical connectors containing other arrays of optical fibers, the optical fibers within the connector are precisely aligned with the other optical components.

A method of fabrication of the connector comprises disposing a pair of hollow tubes and one or more optical fibers within respective grooves in an alignment fixture similar to known alignment fixtures for precisely positioning fibers and tubes relative to one another and preferably in parallel relationships. "Front" portions of the tubes and fibers are fixedly held on the fixture, and "rear" portions of the tubes and fibers extend, still in precisely positioned relationship, away from a common end of the fixture. The extending "rear" portions of the fibers and tubes, but not the "front" portions thereof or the fixture itself, are encapsulated in a molding compound which hardens into a solid plug. The plug is then severed from the unencapsulated front portions of the tubes and fibers preferably by cutting entirely through the plug in a direction perpendicular to and intersecting the encapsulated fibers and tubes. Such cutting, preferably followed by grinding and polishing or the like, provides the aforementioned plug common external surface at which end faces of the fibers and tubes are exposed. The alignment pins are then optionally inserted into the tubes for converting the "female" connector as initially fabricated into a "male" connector. The completed connector does not include the alignment fixture used in the fabrication process, which fixture is then available for re-use.

An advantage of the use of two openings and two alignment pins is that precise angular alignment of the connector is obtainable relative to matching components. A single opening and single alignment pin can be used with other means being provided for obtaining angular alignment. Examples of such other means are described hereinafter.

DESCRIPTION OF THE DRAWING

The drawing figures are schematic and not necessarily to scale.

FIG. 2 is a perspective view of an optical fiber connector according to the invention;

DESCRIPTION OF PREFERRED EMBODIMENTS

Figure 1A:
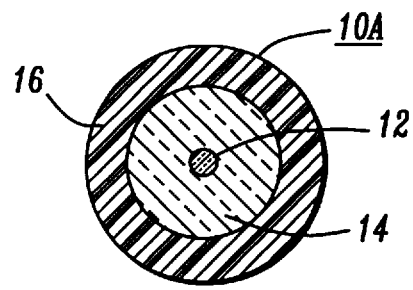
FIGS. 1A, 1B and 1C are cross-sections of typical optical fibers.
Figure 1B:
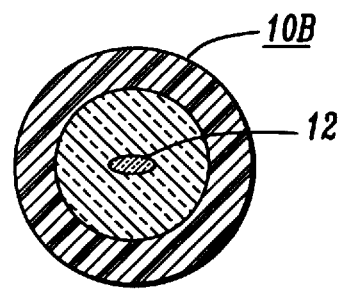
Figure 1C:
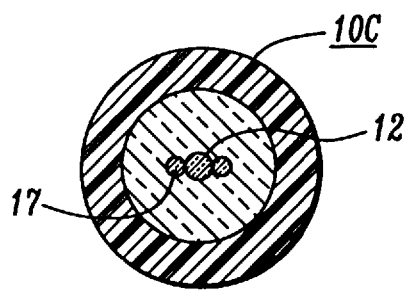

FIGS. 1A, 1B and 1C show end views of typical optical fibers 10A, 10B and 10C, respectively. All the fibers comprise a central core 12 of glass, a glass cladding layer 14, and a protective outer layer 16 which is generally either an acrylic (soft) plastic material, having an outer diameter of around 250 microns, or of a polyimidic plastic material, having an outer diameter of around 135–170 microns. In FIGS. 1A and 1C, the fiber cores are circular; in FIG. 1B the core is elliptical. In FIG. 1C, a pair of glass stress rods 17 are provided on opposite sides of the core 12. Any of the fibers illustrated, or other fibers, can be used in connectors according to the invention, but the choice of fiber slightly modifies the fabrication of the connectors.

FIG. 2 shows an example of a connector 20 made according to the invention. As illustrated, the connector 20 comprises a solid, rectangular plug 22 of a known molding compound described hereinafter. Embedded within the plug, 22 are two parallel hollow tubes 24, e.g., of stainless steel, and an array of optical fibers 10. In this embodiment, the fibers are of the type (10A) shown in FIG. 1A, are coated with soft plastic outer layers and, as shown, "front" portions 26 of the fibers embedded within the plug 22 have been stripped of their outer layers 16 and comprise only the glass portions (core 12 and cladding 14) of the fibers. The stripped portions 26 of the fibers are joined to "rear" fully clad portions 28 of the fibers which are also encapsulated within the plug 22. The fiber rear portions 28 extend outwardly of the plug and form a typical type of optical fiber cable 30. The reason stripped fibers are used within the connector is described hereinafter.

All the fibers 10 and tubes 24 terminate at a common external surface 32 of the plug 22 and extend inwardly of the plug from the surface 32. End faces of the fibers and tubes are exposed at the surface 32 and are generally, but not necessarily, flush with the surface. In any event, end faces 34 of the fibers 10 are fully uncovered at the surface 32 and openings 36 are provided at the surface 32 which extend interiorly of the plug 22. Preferably, all the fibers 10 and openings 36 are precisely parallel to one another with their axes of elongation being co-planar. The surface 32 is generally planar and generally perpendicular to the plane containing the parallel fiber and tube axes. Variations from such "general" configurations are described hereinafter.

FIG. 2 shows end portions 25 of the tubes 24 extending rearwardly of the plug 22. This is optional and is discussed further hereinafter. FIG. 2 also shows, spaced apart from the connector 20, a pair of alignment pins 40, e.g., of stainless steel, which are dimensioned to fit snugly and precisely within the plug openings 36 formed by the embedded tubes 24. Without the pins 40 in place, the connector 20 is of the female type. With the pins 40 inserted and fixed (as by gluing) within the openings 36, and extending forwardly of the plug surface 32, the connector is of the male type.

The connector openings 36 and fiber end faces 34 are precisely positioned relative to one another. Accordingly, in one application using a pair of complementary male and female connectors, the optical fibers in the two connectors are precisely optically coupled together by inserting the pins of the male connector into the openings of the female connector and moving the connectors together for directly contacting the two external surfaces 32. Once so coupled together, known type spring clips (not shown) can be used for maintaining the two connectors firmly pressed together.

The connector 20 can be fabricated as follows.

Figure 3:
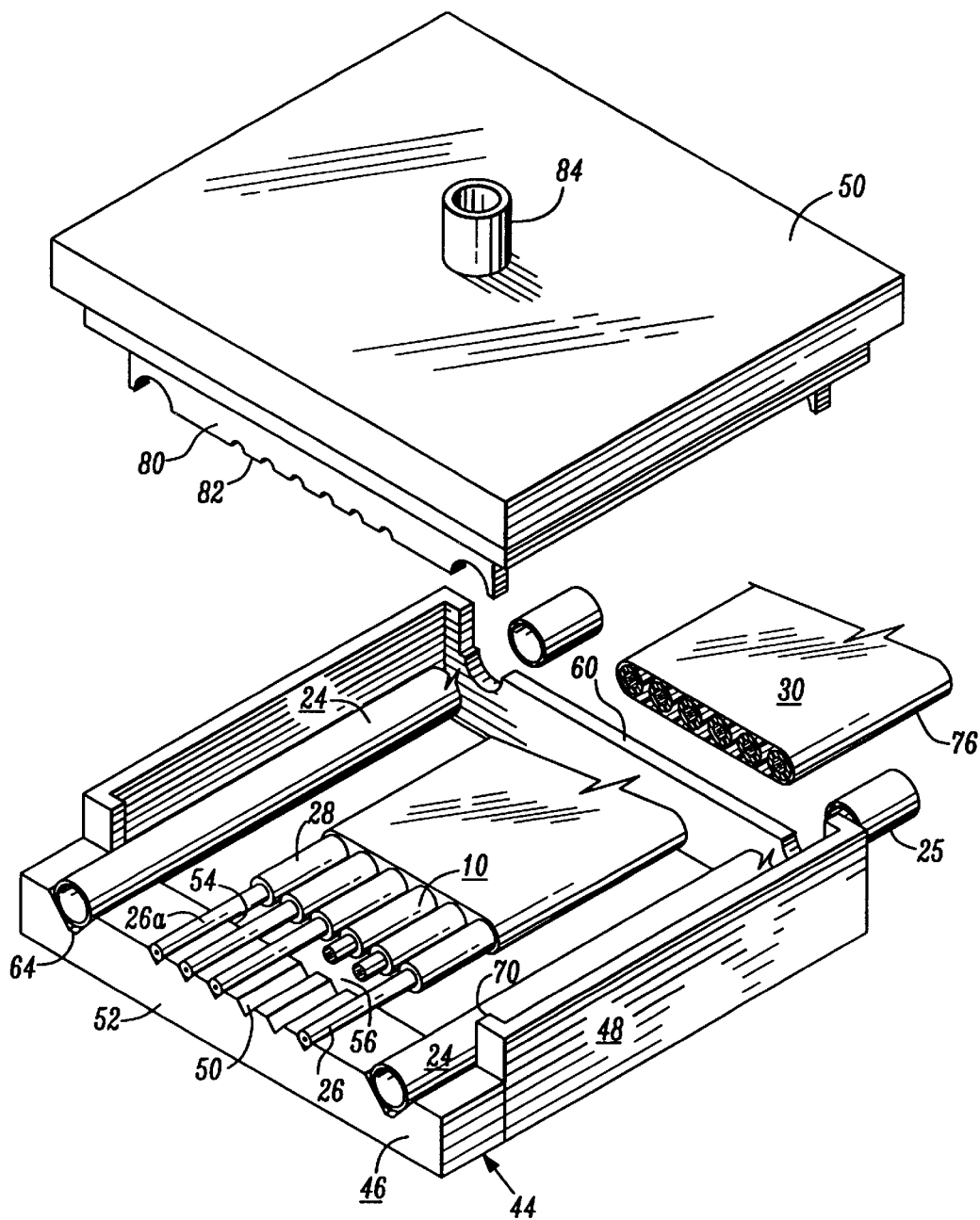
FIG. 3 is a perspective and partly exploded view of a loaded assembly fixture for fabricating connectors according to the invention.

FIG. 3 shows an example of an assembly 44 usable in the fabrication process comprising an alignment fixture 46 and a mold 48. The mold 48 includes, as shown in FIG. 3., a mold top plate 50; the top plate 50, however, not being in place at the start of the fabrication process. The alignment fixture 46 is similar to known alignment fixtures used in prior art connectors and, in that it contains a number of V-grooves, is referred to as a V-block. Also, it is preferably made using identical materials and processes used in the fabrication of priority known V-blocks. Thus, briefly, the V-block 46 is preferably made of silicon and is shaped using known photolithographic and etching processes. Because the fabrication of V-blocks of silicon is well known, details of the actual fabrication of the V-block 46 shown in FIG. 3 are not provided.

One difference between the present invention and known connectors is that the alignment V-block is not incorporated within the final connector and remains available to be used on a repetitive basis. For extending the life of the V-block 46, the silicon block 46 can be coated with a hard metal, e.g., tungsten or nickel. Also, using known replicative processes, a silicon block can be used as a master for fabricating identical blocks formed completely of a hard metal, e.g., nickel. In the replication process, the master silicon block has "inverse" features of the ones shown in FIG. 2; e.g., instead of V-grooves, V-shaped ridges are used.

While the mold portion 48 of the assembly 44 can also be of silicon, this is generally not preferred because silicon is excessively brittle. Also, as described hereinafter, the degree of dimensional precision required of the mold 48 is considerably less than that required for the V-block 46. Thus, for reasons of greater strength, durability, cost and simplicity, the mold 48 is preferably made from a metal, e.g., steel, and can be fabricated using known machining processes. The V-block 46 is connected to the mold portion 48 by screws or the like.

The actual shape and dimensions of the V-block 46 are a function of the number and arrangement of the optical fibers to be included in the completed connector. The connector 20 shown in FIG. 2 includes six co-planar fibers 10 and, to this end, the V-block 46 includes six identical and parallel V-grooves 50 extending between a front end 52 of the block 46 and a rear end 54 adjoining the mold portion 48. With other fiber arrays, correspondingly shaped and dimensioned V-blocks are used.

In accordance with the connector configuration shown in FIG. 2, the array of V-grooves 50 in the block 46 is at a height about mid-way of the height of the mold portion 48; the inner floor 56 thereof being spaced somewhat below the level of the V-grooves 50. Six optical fibers 10 are shown mounted within the assembly 44. Front portions 26 of the fibers 10 are disposed in respective V-grooves 50 while rear portions 28 of the fibers extend rearwardly of the rear end 54 of the V-block 46. Although sections of the rear portions of the fibers are shown broken away, for revealing rear portions of the mold 48, the fibers 10 are continuous through the mold and continue rearwardly thereof. The fiber rear portions 28 are supported on a rear ledge 60 of the mold 48 and are spaced above the bottom floor 56 of the mold 48. The top surface of the ledge 60 is disposed relative to the level of the V-grooves 50 such that the fibers lie generally flat in a common plane. Precise positioning of the fibers is controlled primarily by the V-grooves 50 in the V-block 46, as hereinafter described, and the positioning of the ledge 60 is not critical.

Also included in the V-block 46 are a pair of flat bottomed V-grooves 64 disposed on each side of the array of V-grooves 50. Disposed within the grooves 64 are hollow tubes 24 having highly precise dimensions and circular shape. Fortunately, hollow tubes, e.g., of stainless steel, having the necessary dimensional precision are commercially available. The precision required is a function of the connector application, but, by way of example, the tubes have an inner diameter of 700 microns, plus 1, minus 0 microns.

Tubes 24 of other materials, e.g., glass and zirconia ceramics, can be used.

The various grooves 50 and 64 precisely position the fibers 10 and tubes 24 relative to one-another. As previously mentioned, in connection with the description of the connector 20 shown in FIG. 2, front portions 26 of the fibers 10 are stripped of their outer protective layers. This is done because, in the case of fibers coated with acrylate layers, the layers are so soft as to easily deform. Precise positioning of the fiber cores by positioning of the outer layers is thus impractical, hence the outer layers are removed (by known means, e.g., etching), for exposing the hard and precisely dimensioned and shaped glass portions of the fibers which are received within the V-grooves.

As shown in FIG. 3, the stripped "front" portions 26 of the fibers extend at least slightly rearwardly of the V-block 46 and inwardly of the mold 48. (To distinguish from clad portions 28 of the fibers within the mold, such slightly rearwardly extending "front" portions are designated by reference numeral 26a in FIG. 3.) The rearwardly extending stripped "front" portions 26a ensure that only stripped portions 26 are received within the V-grooves, for precise positioning of the fiber cores, and that at least short lengths 26a of the stripped portions are within the mold for being encapsulated within the plug of the finished connector. This is described hereinafter. Also, it is important that fully clad portions 28 of the fibers extend into the mold 48 from the rear end thereof. This ensures that the portions of the fibers 10 extending rearwardly from the finished connector 20 (FIG. 2) are fully protected.

While not illustrated, fibers formed with hard plastic polyimide outer layers can also be used in the inventive connectors. Generally, such hard layers provide a relatively high degree of accuracy of the location of multi-mode fiber cores, hence when such fibers are used, the "front" portions of the fibers disposed within the V-grooves of the V-block need not always be stripped.

Figure 4:
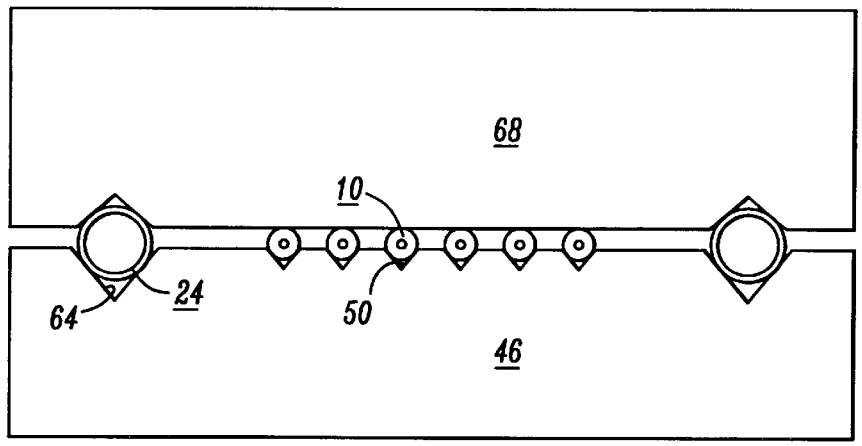
FIG. 4 is a front view of the assembly shown in FIG. 3 with an additional fixture part added thereto.

The actual fit of the fibers and tubes within their respective grooves is shown in FIG. 4. In all cases in this embodiment, sides of the circular fibers and tubes make point contacts with the walls of the V-shaped grooves. As generally known, such "point" contacts (actually, front to back extending "line" contacts) provide high precision positioning of circular, cylindrical objects provided the objects sit firmly within the grooves. To this end, it is convenient to press the various fibers and tubes into their respective grooves by means of suitable weights, e.g., a metal plate 68 as shown in FIG. 4. The precision of the fibers, tubes and grooves is so great that with only negligible distortions of extra high objects, e.g., fibers of slightly high outer diameter, all the fibers and tubes are contacted by the weight plate 68 and held firmly in place within their respective grooves.

Typical glass cored optical fibers are relatively stiff, and with the front portions 26 (FIG. 3) of the fibers held precisely in place by the V-grooves 50, the portions 26a of the fibers extending immediately rearwardly of the V-block 46 and into the mold portion 48 are similarly precisely positioned relative to one another. By "immediately rearwardly" is meant those portions of the fibers which extend only a short distance, e.g., around 3 mm, into the mold from the front end 70 of the mold. Thus, provided such "immediately rearward" portions 26a retain the precise positioning provided by the V-block, deviations from such positioning with increasing distance from the V-block are of little concern.

Obtaining and maintaining such precision of the rearwardly extending portions 28 of the fibers 10 is surprisingly simple. Thus, owing to the relative rigidity and "straightness" of commercially available optical fibers (by "straightness" meaning lack of twist even when the fibers are unwound from a drum), the process of firmly seating front portions 26 of the fibers within V-grooves 50 (e.g., of a front to back length of around 1–2 cm, but not critical) provides quite accurate positioning of the rearwardly extending portions 26a provided no skewing forces are being applied to the fibers. With individual fibers having freely extending rear ends, this is easily attainable. Also, such precise positioning is even easily obtainable when the fibers being assembled into a connector are rigidly interconnected within a multi-fiber ribbon cable. Such a cable 30 comprising a co-planar array of fibers 10 embedded within a flat layer 76 of plastic is shown in FIG. 3. Typically, the spacings between the fibers 10 within the cable 30 are different from, and not nearly as precise as, the spacings between the V-grooves 50. Still, by stripping away the cable layer 76 for exposing a relatively short length (e.g., 1–2 cm) of individual fibers 10, adequate positioning accuracy of the portions 26a of the fibers immediately rearward of the V-block 46 is obtained.

The tubes 24 (FIG. 3) within the V-grooves 64 also extend rearwardly of the V-block 46 and into the mold portion 48. The tubes 24 are designed to be quite stiff relative to their weights and, with the front portions of the tubes 24 firmly seated within their respective grooves 64 (e.g., by the weight plate 68 shown in FIG. 4), the rearwardly extending tube portions remain precisely co-axial with their groove 64 positioned front portions.

In FIG. 3, the tubes 24 are shown extending rearwardly beyond the rear end of the mold portion 48. Such extending rear portions correspond to the tube portions 25 shown in FIG. 2.

With the tubes 24 and fibers 10 disposed within the assembly 44 as shown in FIG. 3, the mold portion 48 is closed with the top plate 50. The top plate 50 provides an enclosed mold space and, to this end, includes a dependent front dam 80 for separating the mold space from the V-block. The front dam 80 comprises a high temperature compliant material, e.g., a thermoset plastic, having a bottom end 82 shaped to fit around the rearwardly extending portions of the tubes and fibers. The purpose of the front dam is to prevent contact of the molding material with the V-block so that the block remains clean and readily usable in a subsequent fabrication process. However, the shape and dimensions of the front portion of the plug being formed are of little importance and it is of no concern if molding material oozes forwardly out of the mold around the fibers and tubes provided no displacements of the tubes and fibers occurs.

Figure 5:
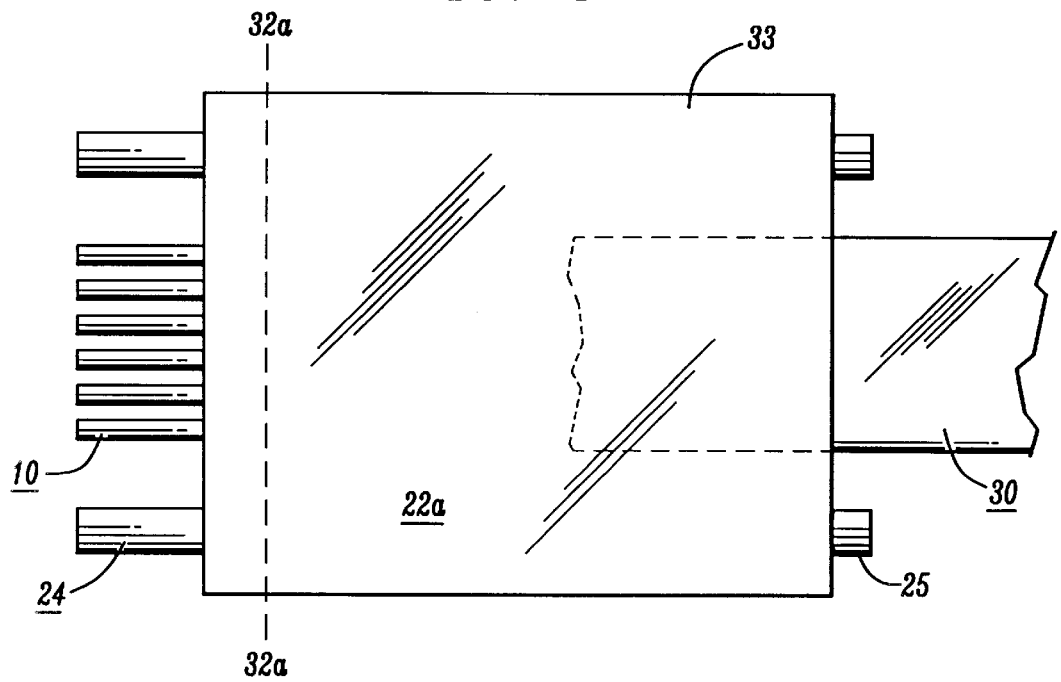
FIG. 5 is a plan view of a work product made using the assembly shown in FIGS. 3 and 4.

Although not shown in FIG. 3, a rear dam similar to the front dam 80 is used for preventing escape of the molding material rearwardly of the mold 48. Various known molding materials commonly used in the fabrication of known products, e.g., semiconductor integrated circuits, can be used. The presently preferred molding material is generically known as cresol-novolac and commercially available, e.g., from Ciba-Geigy Corp. by tradename of ARATRONIC 2184. The molding material is injected at around 5000 p.s.i. and at a temperature of between 170°–190° C. into the mold through an injection tube 84 in the mold top plate 50. An important characteristic of the molding material used is that, as it sets, it creates no internal forces tending to change the positional accuracy of the fibers and tubes. At the conclusion of the molding process, the molded work product is removed from the mold and appears as shown in FIG. 5. The portions of the fibers 10 and tubes 24 which had been disposed within the respective V-grooves 50 and 64 (FIG. 3) of the V-block 46 now extend forwardly of a solid plug 22a. The V-block 46 is not attached to the work product because the fibers and tubes were not fixedly attached to the block 46, and the mold 48 and block 46 portions of the assembly fixture 44 were sufficiently isolated from each other for preventing encapsulation of any portions of the block 46 within the plug 22a.

Then, to complete the fabrication process, a cut is made entirely through the plug 22a along a plane indicated by the line 32a–32a of FIG. 5 and extending, downwardly through the illustrated top surface 33 of the plug 22a. Known cutting means, e.g., a circular saw, can be used and, for precisely controlling the angle of the cut, a fixture of a type hereinafter described can be used for precisely positioning the plug 22a relative to the cutting blade by means of the rearwardly extending tube portions 25. These portions 25 are precisely aligned with the embedded fibers 10, and the cut surface 32 (FIG. 2) of the plug 22 can thus be readily set at any selected angle relative to the axes of the embedded fibers 10.

Typically, the cut surface 32 (FIG. 2) of the plug 22 of the completed connector 20 is at a right angle to the axes of the fibers 10 and tubes 24, and the cut surface 32 fully exposes end faces 34 and 36 of the fibers and tubes, respectively. For greater precision of the final end surface 32 of the plug 22, the cut surface 32 is further processed, e.g., by known grinding and polishing processes, to provide a surface 32 of precise relationship to the fiber and tube end faces. An example of a polishing apparatus is shown schematically in FIG. 6. The apparatus includes a known polishing wheel 100 mounted on and rotated by a spindle 102. A mounting and tilting fixture 104 is used, in accordance with this invention, for pressing a surface 32 of a connector plug 22 against a side face 106 of the polishing wheel for polishing the surface 32 at a precisely controlled angle relative to the axes of the optical fibers 10 within the plug.

Figure 6:
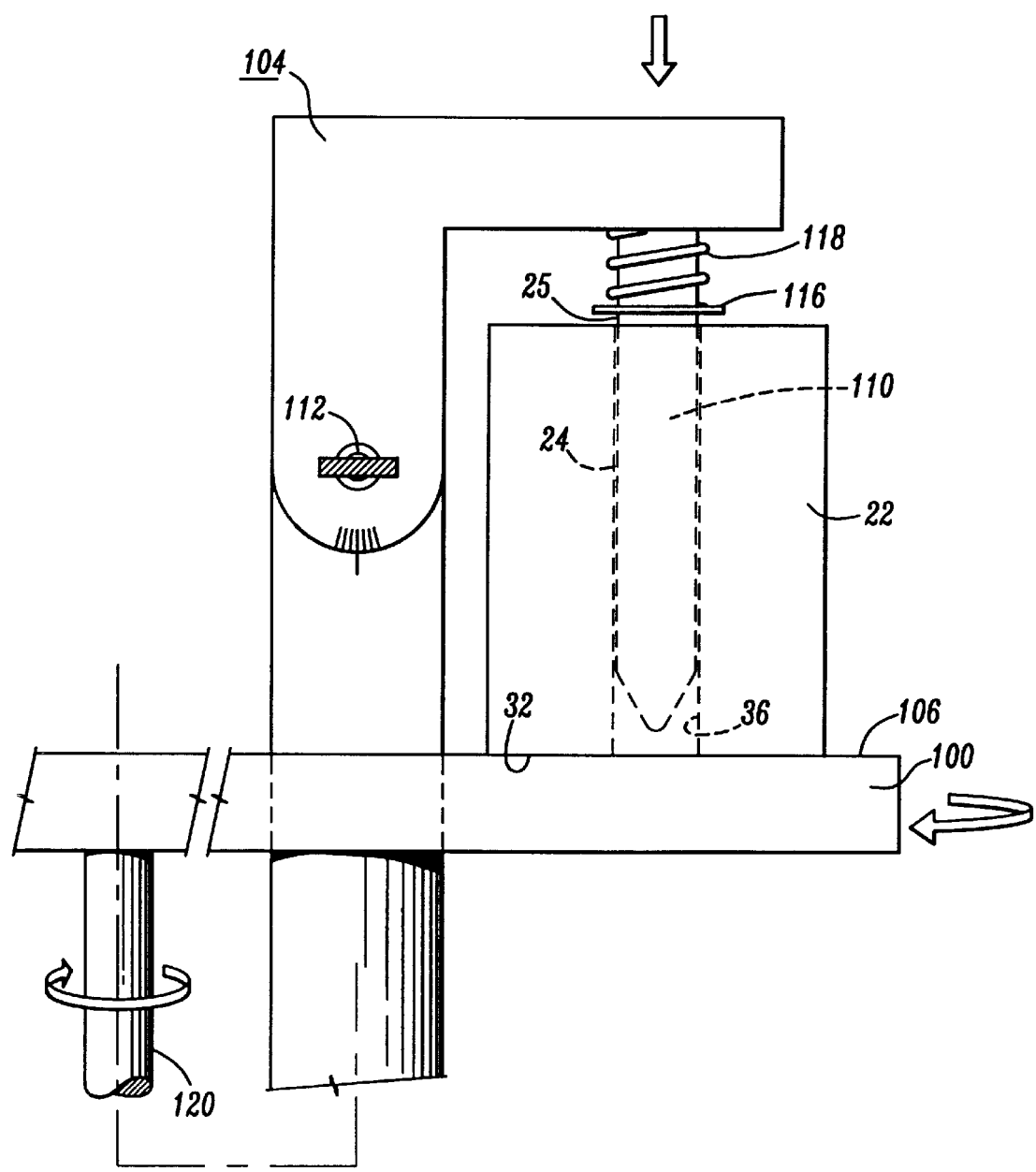
FIG. 6 is a schematic illustration of an alignment fixture according to the invention used with a known polishing wheel.

The fixture 104 includes one or more alignment pins 110 depending upon the number of tubes 24 within the plug 22. In FIG. 6, only a single pin 110 is visible, but if another pin is used it is directly behind and hidden by the pin 10. The alignment pin 110 fits snugly within the tube 24 and precisely aligns the plug 22 relative to the fixture 104. The fixture 104 is angularly positionable around an axle 112 for controlling the tilt of the fixture 104 relative to the polishing wheel and for controlling the angle of the plug surface 32 relative to the wheel 100. Means, not shown, are provided for controllably moving the fixture 104 parallel to the axis of the spindle 102 for pressing the plug 22 against the polishing wheel face 106. Force is applied against the plug 22 by means of a pressure annular plate 116 slidably mounted on the pin 110 by means of a compressive spring 118 also mounted on the pin 110. The pressure plate 116 presses against the rear end of the projecting portion 25 of the tube 24.

The fixture 104 shown in FIG. 6 for use with a polishing wheel can also be used with a cutting wheel for precisely controlling the previously described plug slicing step.

As previously mentioned, the plug surface 32 is typically perpendicular to the axes of the fibers 10 and tubes 24. In one variation, illustrated in FIG. 7, two surfaces 32 of two connectors 20 and 20a connected together (by means of mutually connected alignment pins 40, as previously described) are slightly tilted (e.g., by around 8 degrees) from the normal to the fiber axes of elongation. Such slight tilting of the end surfaces 32 relative to the fiber end faces 34 is known to improve the quality of the optical coupling between aligned fibers by reducing back reflections of light at the surfaces 32. In FIG. 7A, the same effect is obtained by the use of a surface 32 normal to the plane of the fibers but tilted slightly, e.g., 8 degrees from normal to the fiber axes.

Typically, as shown in FIG. 2, the fiber end faces 34 and the tube end faces 36 lie precisely in and flush with the surface 32. In one variation, also shown in FIG. 7, ends 80 of each fiber 10 project slightly forwardly of their respective plug surfaces 32. The space between two surfaces 32–32 may be filled with a known layer (not shown) of index matching fluid. The contacting arrangement shown in FIG. 7 ensures that when the two connectors 20 and 20a are brought together an actual fiber end face to end face engagement occurs between each pair of aligned fibers which, as known, provides optimum optical coupling between the thus physically connected together fibers.

Figure 7:
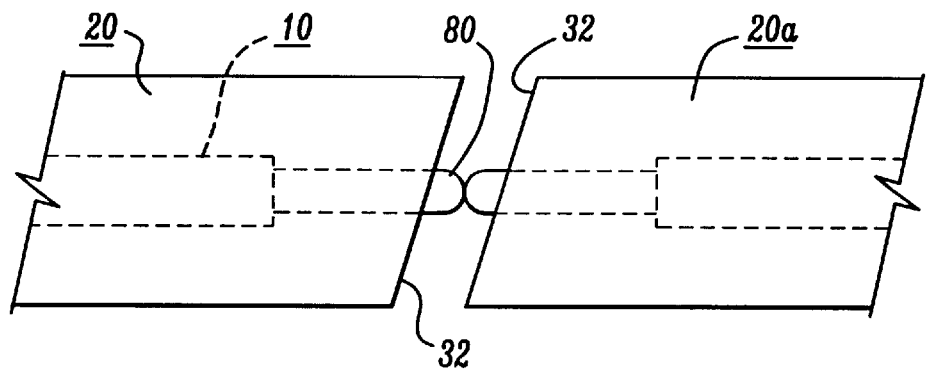
FIG. 7 is a schematic side view showing the interface between two connectors in accordance with one embodiment of the invention.
Figure 7A:
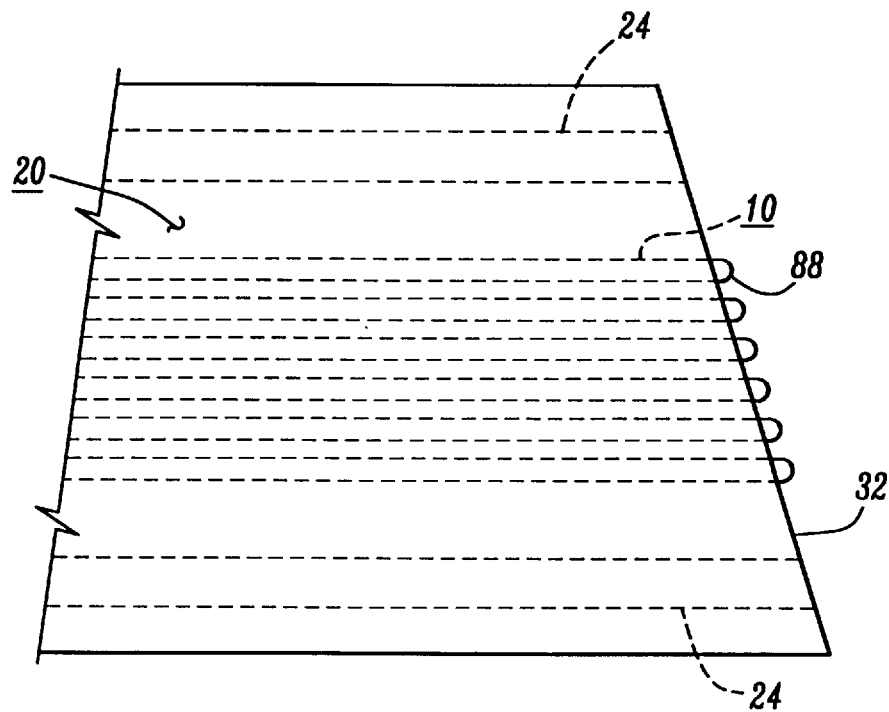
FIG. 7A is a partial plan view of the connector shown in FIG. 2 illustrating an angled connector surface.

A feature of the present invention is the ease with which the coupling arrangements shown in FIG. 7 are obtainable. The desired tilts of the surfaces 32 relative to the fiber end faces 34 are readily obtainable, as described, by making use of the precisely positioned extending tube portions 25 for precise control of the plug slicing and polishing processes. Also, by selecting the plug encapsulating material to be softer than that of the fibers, the polishing of the plug material tends to occur at a faster rate than that of the fibers, and the slightly protruding fiber ends tend to inherently occur owing to such faster polishing of the plug material.

Figure 8:
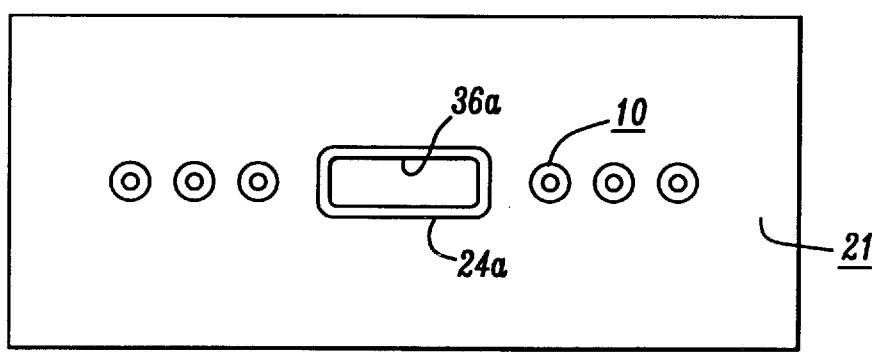
FIG. 8 is a front end view of a connector such as shown in FIG. 2 but showing a modification thereof.

As previously noted, two tubes 24 are preferably included within the connectors 20 for providing two elongated openings 36 into the connectors. The spaced tubes 24, in combination with the two spaced alignment pins 40, provide precise angular alignment between two interconnected connectors, e.g., connectors 20 and 20a as shown in FIG. 7. FIG. 8 shows a connector 21 containing but a single opening 36a (provided by a single hollow tube 24a) but of rectangular cross-section. By use of a corresponding rectangular cross-section alignment pin (not illustrated), proper angular orientation of the connector relative to a mating optical component is obtained. Other shaped single openings (and correspondingly shaped plug alignment pins), e.g., elliptical and cross-shaped, can be used.

In another arrangement, not illustrated, a single connector opening and a single alignment pin are used, and proper angular orientation is obtained by means of a mating fit between another surface of the connector, e.g., the top surface 33 of the connector 20 shown in FIGS. 2 and 5, and a corresponding surface (e.g., within a cavity) of another component. The "another" surface of the connector must also be precisely located with respect to the fibers embedded therein, but the provision of the two rearwardly extending tube portions 25 provides, as previously noted, a simple means for obtaining precise machining of the outer surfaces of the connector plug.

As previously noted, the provision of the rearwardly extending tube portions 25 is optional. Thus, for example, the portions 25 can be cut-off after completion of the connector 20 shown in FIG. 2. Alternatively, tubes 24 shorter than those shown in FIG. 3 can be used which do not extend rearwardly from the mold portion 48 but terminate therewithin. To prevent the molding material from entering the rear ends of the tubes 24 during the molding process, the ends are closed off, e.g., by crimping the tube rear ends or by the use of closed-end tubes. With reference to the alignment fixture 104 shown in FIG. 6, rearwardly projecting tube portions 25 are used to ensure that openings are available at the plug rear ends for entry of the fixture guide pins 110.

As described, a feature of the invention is that the fixture (e.g., the alignment V-block 46 shown in FIG. 3) used for relatively positioning the fibers 10 and tubes 24 is not included within the finished connector 20. Accordingly, provided freely extending, precisely positioned fiber and tube lengths are made available for encapsulation, different types of alignment fixtures can be used. For example, the fiber and tube ends can be held in various clamping arrangements, and alignment blocks having other align, it means, e.g., U-shaped rather than V-shaped grooves, can be used.

In FIG. 3, the various grooves 50 and 64 are so arranged that the axes of elongation of all the fibers 10 and tubes 24 are co-planar and exactly mid-way of the height of the mold 48. In the completed connector 20 shown in FIG. 2, the intercepts of all the fibers and tubes are thus symmetrical with respect to a central point (not shown) of the external surface 32 of the plug 22. The connector 20 is thus "polar" in the sense that it can be properly mated with another optical component in the orientation shown in FIG. 2 or rotated 180 degrees, in the plane of FIG. 2, from the position shown. If either the fibers or tubes are asymmetrical with respect to such central point, the connector is "non-polar" and can be interconnected in only one angular orientation. The connectors 20 and 20a shown in FIG. 7 are also "non-polar" because of the angled front surfaces 32 thereof.

What is claimed is:

1. A method of fabricating an optical fiber connector comprising the steps of disposing a first portion of an optical fiber within a first groove within an alignment block with a second portion of said fiber extending away from an end of said block, disposing a first portion of a hollow tube within a second groove within said alignment block with a second portion of said hollow tube extending away from said block end, rigidly encapsulating said second portions of said fiber and said tube within a plug, and severing said plug from said first portions of said fiber and tube.

2. A method according to claim 1 including disposing said first and second portions of said fiber and said tube along respective lines parallel to one another.

3. A method according to claim 1 wherein said encapsulating step comprises enveloping said fiber and tube second portions but not said first portions or said block within an encapsulating material for forming said plug, and said severing step comprises slicing through said plug for forming a plug external surface intersecting and exposing end faces of said fiber and said tube.

4. A method according to claim 1 including, prior to said fiber disposing step, stripping a protective coating from an optical fiber for providing a first portion thereof including only a stripped fiber connected to a third, fully coated portion of said fiber, and wherein, in said fiber disposing step, only said fiber stripped first portion is disposed within said first groove.

5. A method according to claim 1 including performing said encapsulating step for embedding said second portions of said fiber within said plug with said first portions of said fiber and said tube projecting outwardly in a first direction from one side of said plug and with third portions of said fiber and said tube projecting in a direction opposite to said first direction from another side of said plug.

6. A method according to claim 1 including firmly seating said fiber and said tube within their respective first and second grooves for precisely positioning the fiber and tube relative to one another both along said groove disposed first portions and along said second portions extending away from said block.

7. A method according to claim 4 including disposing said fiber and said tube second portions within a mold adjacent to said alignment block, and enclosing said second portions within a space within said mold isolated from said block for encapsulating said second portions but not said block.

8. A method according to claim 7 including disposing said third portion of said fiber for extending, from said fiber second portion, from within said mold space to outwardly therefrom for encapsulating a length of said fiber third portion within said plug.

9. A method according to claim 3 including forming said plug external surface to be normal to said fiber where it intersects said surface.

10. A method according to claim 5 including performing said slicing step using said projecting third portion of said tube as a means for precisely positioning said plug.

11. A fixture for use in the fabrication of an optical fiber connector comprising an alignment block for precisely relatively positioning an optical fiber and a hollow tube, a mold for forming a mold space for receipt of respective portions of said fiber and said tube extending away from said alignment block and for receipt of a molding material for encapsulating said respective portions of said fiber and said tube, means for firmly securing said fiber and said tube to said alignment block for precisely relatively positioning said tube and fiber respective portions where they first enter said mold space, and means for isolating said mold space from said alignment block for preventing molding material injected into said mold space from contacting said alignment block.

12. A fixture according to claim 11 wherein said alignment block is formed from silicon to a first degree of dimensional precision, and said mold is formed of a material other than silicon to a second degree of dimensional precision less than that of said alignment block.

13. An optical fiber connector comprising an array of optical fibers extending along parallel first lines intersecting an external surface of said plug, a pair of hollow tubes extending inwardly of said plug from said external surface along second lines parallel to said first lines and co-planar therewith, said external surface being planar and disposed at a preselected angle other than 90° relative to said common plane of said first and second lines.

14. A connector according to claim 13 wherein said preselected angle is about 82 degrees.

15. A connector according to claim 13 wherein said plug is solidly compacted against substantially the entire external surfaces of said fibers within said plug.

16. A connector according to claim 13 wherein said external surface has a central point, and the intersections of said fibers with said surface are asymmetrical with respect to said central point.

17. An optical fiber connector comprising a plug enclosing an optical fiber and an elongated first opening, said fiber extending along a line intersecting an external first surface of said plug and said fiber having an end face optically exposed at said external surface, said opening extending inwardly from said surface along an axis parallel to said line, and said opening having a non-circular cross-section.

18. A connector according to claim 17 wherein said plug is solidly compacted against substantially the entire external surface of said fiber within said plug.

19. A connector according to claim 17 wherein said opening has a rectangular cross-section.

20. A connector according to claim 17 wherein said optical fiber is included within one of two arrays of optical fibers within said plug, respective ones of said arrays being disposed on opposite sides of said opening.

21. A connector according to claim 17 wherein said fiber end face is at the end of a portion of said fiber projecting outwardly from said plug through said external surface.

\* \* \* \* \*